US012563463B2

(12) United States Patent
Bai et al.

(10) Patent No.: US 12,563,463 B2
(45) Date of Patent: Feb. 24, 2026

(54) EVENT-BASED LAYER 1 MEASUREMENT REPORTING

(71) Applicant: QUALCOMM Incorporated, San Diego, CA (US)

(72) Inventors: Tianyang Bai, Somerville, NJ (US); Yan Zhou, San Diego, CA (US); Jelena Damnjanovic, Del Mar, CA (US)

(73) Assignee: Qualcomm Incorporated, San Diego, CA (US)

( * ) Notice: Subject to any disclaimer, the term of this patent is extended or adjusted under 35 U.S.C. 154(b) by 406 days.

(21) Appl. No.: 18/174,130

(22) Filed: Feb. 24, 2023

(65) Prior Publication Data

US 2024/0292293 A1     Aug. 29, 2024

(51) Int. Cl.
*H04W 36/00* (2009.01)

(52) U.S. Cl.
CPC .............. *H04W 36/00837* (2018.08); *H04W 36/0058* (2018.08)

(58) Field of Classification Search
CPC ....... H04W 36/00837; H04W 36/0058; H04W 24/10
See application file for complete search history.

(56) References Cited

U.S. PATENT DOCUMENTS

2018/0199328 A1*   7/2018   Sang .................... H04B 7/0617
2021/0153085 A1*   5/2021   Rahman ................ H04L 5/0053

2021/0195453 A1*   6/2021   Zhang ................. H04B 7/0617
2021/0204344 A1*   7/2021   Babaei .................. H04W 80/02
2022/0225188 A1    7/2022   Pezeshki et al.
2024/0162956 A1*   5/2024   Goyal .................... H04B 7/063
2025/0008363 A1*   1/2025   Chandrashekar ...........................
                                                   H04W 36/0058
2025/0071648 A1*   2/2025   Hong ............... H04W 36/0055

FOREIGN PATENT DOCUMENTS

CN         110463060 B   *   6/2021   ........ H04B 7/06952
WO         2021126636 A1      6/2021
WO    WO-2024097975 A1   *   5/2024   ........ H04W 36/0077

OTHER PUBLICATIONS

International Search Report and Written Opinion—PCT/US2024/012698—ISA/EPO—May 23, 2024.

(Continued)

*Primary Examiner* — Asad M Nawaz
*Assistant Examiner* — Michael Wayne Maddox
(74) *Attorney, Agent, or Firm* — Harrity & Harrity, LLP

(57) ABSTRACT

Various aspects of the present disclosure generally relate to wireless communication. In some aspects, a user equipment (UE) may measure a layer 1 (L1) metric in a candidate cell associated with a layer 1 or layer 2 triggered mobility (LTM). The UE may determine that the L1 metric in the candidate cell satisfies a triggering event condition. The UE may transmit, to a network node, an L1 measurement report based at least in part on the L1 metric in the candidate cell satisfying the triggering event condition. Numerous other aspects are described.

30 Claims, 12 Drawing Sheets

900 ——▶

910 ~ Measure a layer 1 (L1) metric in a candidate cell associated with a layer 1 or layer 2 triggered mobility (LTM)

920 ~ Determine that the L1 metric in the candidate cell satisfies a triggering event condition 930 ~ Transmit, to a network node, an L1 measurement report based at least in part on the L1 metric in the candidate cell satisfying the triggering event condition

(56)           References Cited

OTHER PUBLICATIONS

Luo X (Xiaomi)., et al., "Discussion on L1 Enhancements for Inter-cell Beam Management in LTM", 3GPP TSG RAN WG1 #112, R1-2300557, Type Discussion, NR_MOB_ENH2-CORE, 3rd Generation Partnership Project, Mobile Competence Centre, 650, Route Des Lucioles, F-06921 Sophia-Antipolis Cedex, France, vol. 3GPP RAN 1, No. Athens, GR, Feb. 27, 2023-Mar. 3, 2023, Feb. 17, 2023, 8 Pages, XP052247703, paragraph [0002].

Palle N (Apple Inc)., et al., "On Measurement and Reference Config for LTM", 3GPP TSG RAN WG2#121, R2-2300766, Type Discussion, NR_MOB_ENH2-CORE, 3rd Generation Partnership Project, Mobile Competence Centre, 650, Route Des Lucioles, F-06921 Sophia-Antipolis Cedex, France, vol. 3GPP RAN 2, No. Athens, GR, Feb. 27, 2023-Mar. 3, 2023, Feb. 17, 2023, 7 Pages, XP052245409, paragraph [0002].

* cited by examiner

500

SCell1

Old SCell becomes new PCell

Move

Old PCell becomes new SCell

SCell2

600

700

910 Measure a layer 1 (L1) metric in a candidate cell associated with a layer 1 or layer 2 triggered mobility (LTM)

920 Determine that the L1 metric in the candidate cell satisfies a triggering event condition 930 Transmit, to a network node, an L1 measurement report based at least in part on the L1 metric in the candidate cell satisfying the triggering event condition

900

1010 — Transmit, to a user equipment (UE), an L1 measurement report configuration 1020 — Receive, from the UE and based at least in part on the L1 measurement report configuration, an L1 measurement report based at least in part on an L1 metric in a candidate cell satisfying a triggering event condition, the L1 metric in the candidate cell being associated with an LTM

1000

EVENT-BASED LAYER 1 MEASUREMENT REPORTING

FIELD OF THE DISCLOSURE

Aspects of the present disclosure generally relate to wireless communication and to techniques and apparatuses for event-based layer 1 (L1) measurement reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include a memory and one or more processors coupled to the memory. The one or more processors may be configured to measure a layer 1 (L1) metric in a candidate cell associated with a layer 1 or layer 2 triggered mobility (LTM). The one or more processors may be configured to determine that the L1 metric in the candidate cell satisfies a triggering event condition. The one or more processors may be configured to transmit, to a network node, an L1 measurement report based at least in part on the L1 metric in the candidate cell satisfying the triggering event condition.

Some aspects described herein relate to an apparatus for wireless communication at a network node. The apparatus may include a memory and one or more processors coupled to the memory. The one or more processors may be configured to transmit, to a UE, an L1 measurement report configuration. The one or more processors may be configured to receive, from the UE and based at least in part on the L1 measurement report configuration, an L1 measurement report based at least in part on an L1 metric in a candidate cell satisfying a triggering event condition, the L1 metric in the candidate cell being associated with an LTM.

Some aspects described herein relate to a method of wireless communication performed by a UE. The method may include measuring an L1 metric in a candidate cell associated with an LTM. The method may include determining that the L1 metric in the candidate cell satisfies a triggering event condition. The method may include transmitting, to a network node, an L1 measurement report based at least in part on the L1 metric in the candidate cell satisfying the triggering event condition.

Some aspects described herein relate to a method of wireless communication performed by a network node. The method may include transmitting, to a UE, an L1 measurement report configuration. The method may include receiving, from the UE and based at least in part on the L1 measurement report configuration, an L1 measurement report based at least in part on an L1 metric in a candidate cell satisfying a triggering event condition, the L1 metric in the candidate cell being associated with an LTM.

Some aspects described herein relate to a non-transitory computer-readable medium that stores a set of instructions for wireless communication by a UE. The set of instructions, when executed by one or more processors of the UE, may cause the UE to measure an L1 metric in a candidate cell associated with an LTM. The set of instructions, when executed by one or more processors of the UE, may cause the UE to determine that the L1 metric in the candidate cell satisfies a triggering event condition. The set of instructions, when executed by one or more processors of the UE, may cause the UE to transmit, to a network node, an L1 measurement report based at least in part on the L1 metric in the candidate cell satisfying the triggering event condition.

Some aspects described herein relate to a non-transitory computer-readable medium that stores a set of instructions for wireless communication by a network node. The set of instructions, when executed by one or more processors of the network node, may cause the network node to transmit, to a UE, an L1 measurement report configuration. The set of instructions, when executed by one or more processors of the network node, may cause the network node to receive, from the UE and based at least in part on the L1 measurement report configuration, an L1 measurement report based at least in part on an L1 metric in a candidate cell satisfying a triggering event condition, the L1 metric in the candidate cell being associated with an LTM.

Some aspects described herein relate to an apparatus for wireless communication. The apparatus may include means for measuring an L1 metric in a candidate cell associated with an LTM. The apparatus may include means for determining that the L1 metric in the candidate cell satisfies a triggering event condition. The apparatus may include means for transmitting, to a network node, an L1 measurement report based at least in part on the L1 metric in the candidate cell satisfying the triggering event condition.

Some aspects described herein relate to an apparatus for wireless communication. The apparatus may include means for transmitting, to a UE, an L1 measurement report configuration. The apparatus may include means for receiving, from the UE and based at least in part on the L1 measurement report configuration, an L1 measurement report based at least in part on an L1 metric in a candidate cell satisfying a triggering event condition, the L1 metric in the candidate cell being associated with an LTM.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features May include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
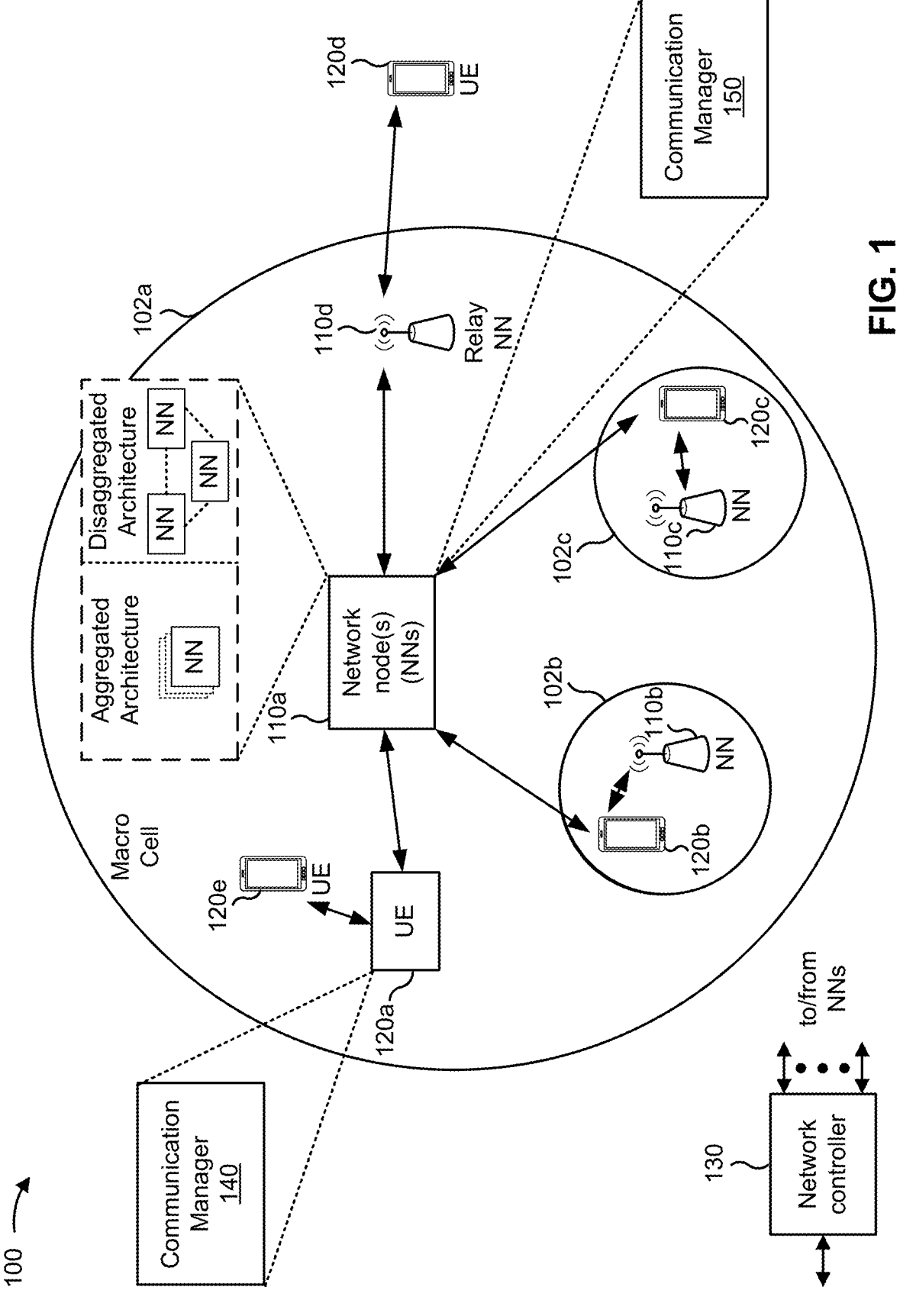
FIG. 1 is a diagram illustrating an example of a wireless network, in accordance with the present disclosure.

In a layer 1 (L1) or a layer 2 (L2)(L1/L2)-triggered mobility (LTM), a user equipment (UE) may perform L1 measurements on one or more candidate cells. The one or more candidate cells may be configured LTM candidate target cells. The UE may transmit an L1 measurement report, indicating the L1 measurements on the one or more candidate cells, to the network node. The UE may transmit the L1 measurement report in a periodic manner, but such an approach may waste resources when L1 measurement reports are not needed but the UE still transmits the L1 measurement reports.

The UE may transmit event-based L1 measurement reports, instead of periodic L1 measurement reports, to conserve resources. In this case, when a certain event occurs and is detected by the UE, the UE may transmit the L1 measurement report. However, for LTM, triggering events and start/stop conditions for transmitting event-based L1 measurement reports may not be defined. In other words, the UE may not be properly configured to detect triggering events associated with the L1 measurement reports. Further, the UE may not be properly configured to determine the start/stop conditions associated with the L1 measurement reports. As a result, event-based L1 measurement reporting by the UE may be associated with inefficiencies. The UE may not properly detect events and, therefore, may not transmit L1 measurement reports to the network node, even when the L1 measurement reports are needed by the network node, which may degrade a performance of the UE. Further, the UE may transmit an excessive quantity of L1 measurement reports because the start/stop conditions may not be properly defined, thereby resulting in excess signaling and power consumption at the UE.

In some aspects described herein, a UE may measure an L1 metric in a candidate cell associated with an LTM. The L1 metric may be an RSRP measurement of a beam associated with the candidate cell. The UE may measure multiple L1 metrics in multiple candidate cells. The UE may determine that the L1 metric in the candidate cell satisfies a triggering event condition. For example, the UE may determine that the L1 metric in the candidate cell satisfies the triggering event condition based at least in part on: a comparison of the L1 metric in the candidate cell and a serving cell metric, a comparison of the L1 metric in the candidate cell and a threshold value, a change in the L1 metric, as compared to a previous measured L1 metric, that satisfies a threshold value, a ranking change associated with the L1 metric in the candidate cell, and/or a quantity of beams associated with the candidate cell satisfying a condition. The UE may transmit, to a network node, an L1 measurement report based at least in part on the L1 metric in the candidate cell satisfying the triggering event condition. The UE may transmit the L1 measurement report based at least in part on an L1 measurement report configuration received from the network node, which may indicate a start condition and a stop condition for transmitting the L1 measurement report, and whether the L1 measurement report is to be transmitted a single time or the L1 measurement report is to be transmitted multiple times until the stop condition is satisfied. As a result, the UE may be properly configured to transmit event-based L1 measurement reports, thereby improving a performance of the UE. The UE may be able to transmit event-based L1 measurement reports without excess signaling and power consumption, which may improve the performance of the UE.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WL1) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IOT) devices, and/or may be implemented as NB-IOT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHZ). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may measure an L1 metric in a candidate cell associated with an LTM; determine that the L1 metric in the candidate cell satisfies a triggering event condition; and transmit, to a network node, an L1 measurement report based at least in part on the L1 metric in the candidate cell satisfying the triggering event condition. Additionally, or alternatively, the communication manager 140 may perform one or more other operations described herein.

In some aspects, a network node (e.g., network node 110) may include a communication manager 150. As described in more detail elsewhere herein, the communication manager 150 may transmit, to a UE, an L1 measurement report configuration; and receive, from the UE and based at least in part on the L1 measurement report configuration, an L1 measurement report based at least in part on an L1 metric in a candidate cell satisfying a triggering event condition, the L1 metric in the candidate cell being associated with an LTM. Additionally, or alternatively, the communication manager 150 may perform one or more other operations described herein.

As indicated above, FIG. 1 is provided as an example. Other examples may differ from what is described with regard to FIG. 1.

Figure 2:
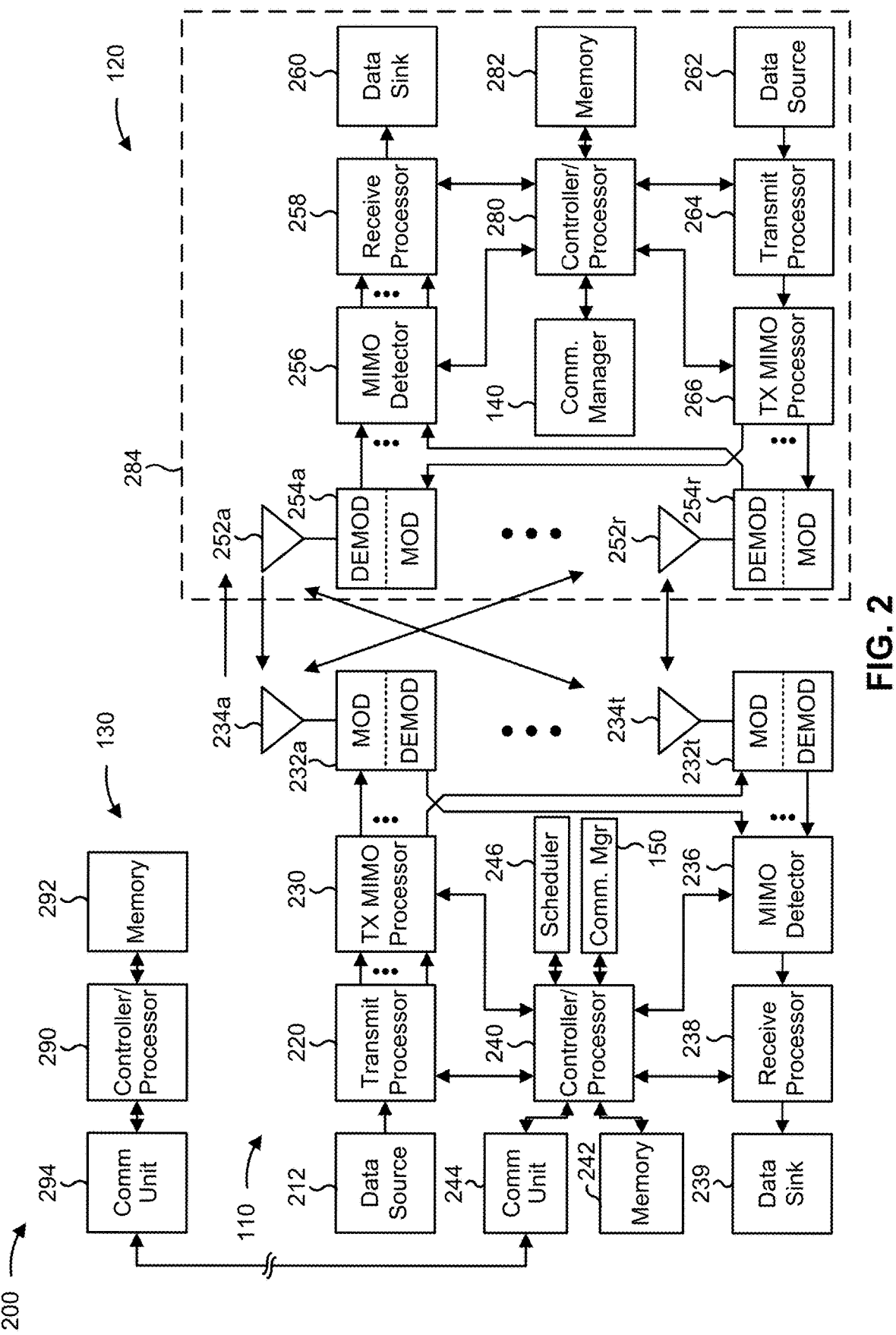
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-12).

The controller/processor 240 of the network node 110, the controller/processor 280 of the UE 120, and/or any other component(s) of FIG. 2 may perform one or more techniques associated with event-based L1 measurement reporting, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a UE (e.g., the UE 120) includes means for measuring an L1 metric in a candidate cell associated with an LTM; means for determining that the L1 metric in the candidate cell satisfies a triggering event condition; and/or means for transmitting, to a network node, an L1 measurement report based at least in part on the L1 metric in the candidate cell satisfying the triggering event condition. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting, to a UE, an L1 measurement report configuration; and/or means for receiving, from the UE and based at least in part on the L1 measurement report configuration, an L1 measurement report based at least in part on an L1 metric in a candidate cell satisfying a triggering event condition, the L1 metric in the candidate cell being associated with an LTM. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
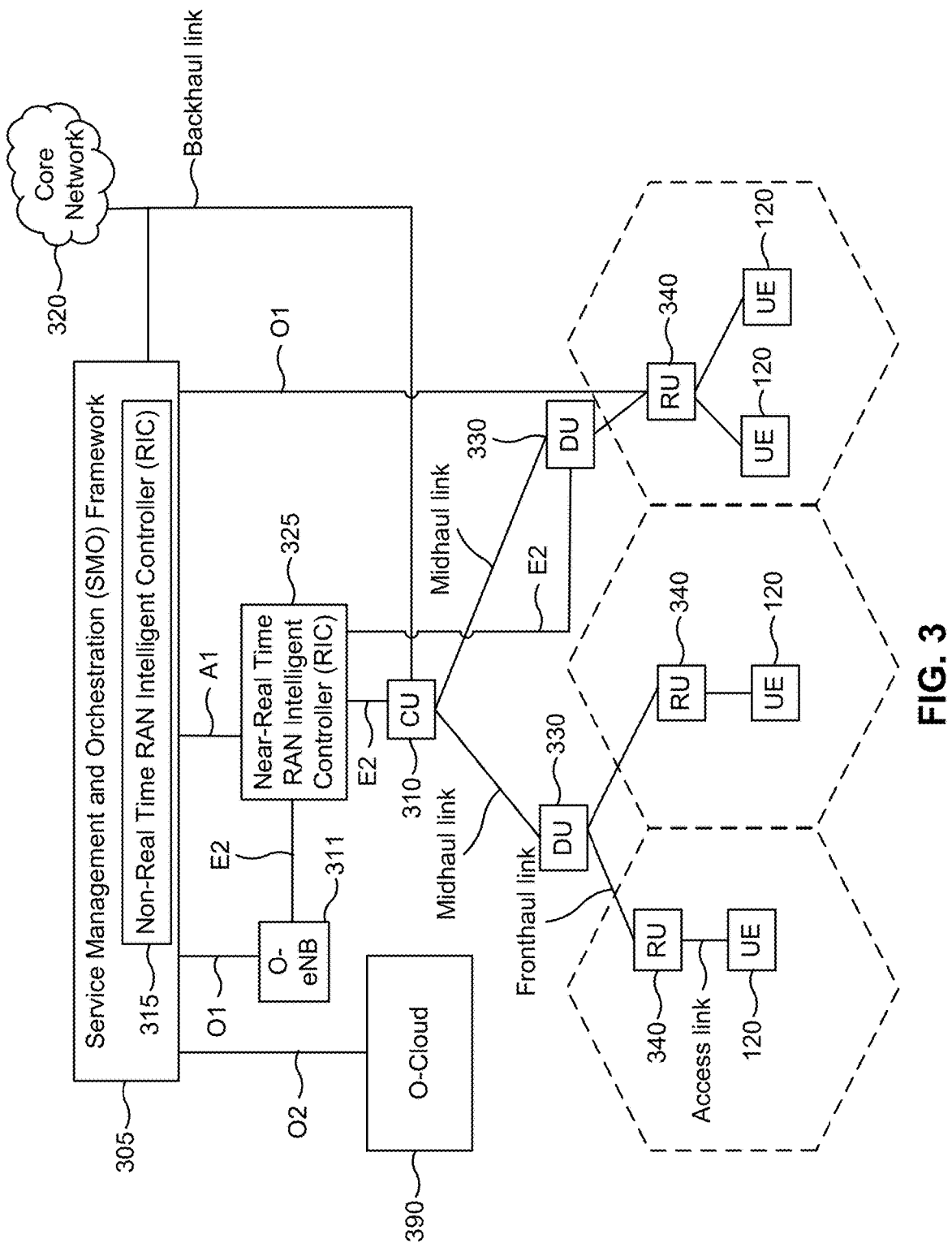
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
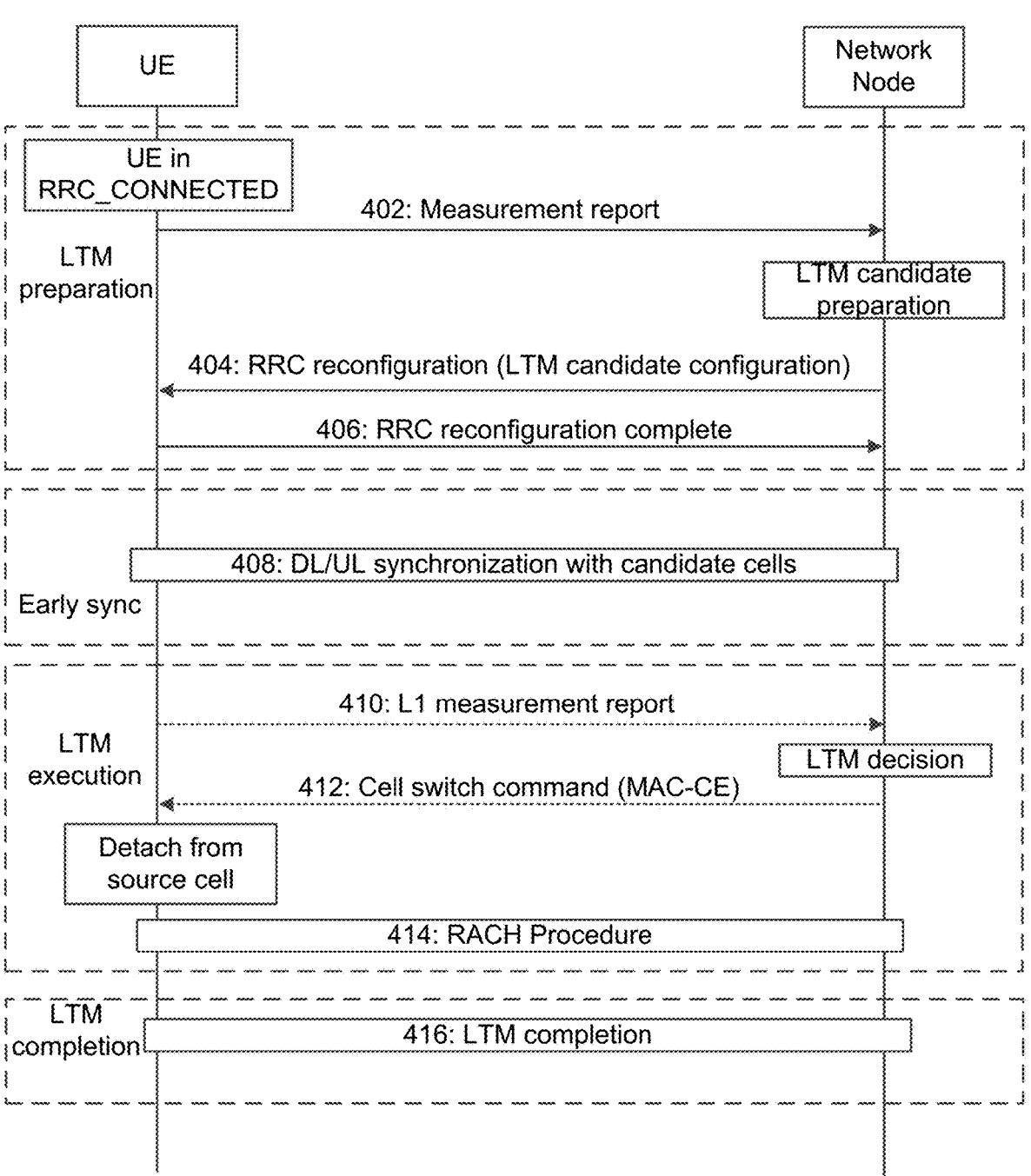
FIG. 4 is a diagram illustrating an example of a layer 1 (L1) or a layer 2 (L2) (L1/L2)-triggered mobility (LTM), in accordance with the present disclosure.

FIG. 4 is a diagram illustrating an example 400 of an LTM, in accordance with the present disclosure.

In an LTM, a UE may be in an RRC connected state. As shown in FIG. 4 by reference number 402, the UE may transmit, to a network node, a measurement report. The UE may transmit the measurement report via RRC signaling. The network node may determine, based at least in part on the measurement report, to use LTM and may initiate a candidate LTM cell preparation. As shown by reference number 404, the network node may transmit, to the UE, an RRC reconfiguration message. The RRC reconfiguration message may indicate a candidate LTM cell configuration, which may indicate a configuration of one or multiple candidate LTM target cells. The UE may store the candidate LTM cell configuration. As shown by reference number 406, the UE may transmit, to the network node, an RRC reconfiguration complete message. The measurement report, the RRC reconfiguration message, and the RRC reconfiguration complete message may be part of an LTM preparation phase.

As shown by reference number 408, the UE may perform a downlink/uplink synchronization and a timing advance (TA) acquisition with candidate target cells, which may occur before receiving an LTM cell switch command. The downlink/uplink synchronization and the TA acquisition may be associated with an early synchronization phase. The UE may perform L1 measurements on one or more configured candidate LTM target cells. As shown by reference number 410, the UE may transmit, to the network node, an L1 measurement report, which may indicate the L1 measurements on the one or more configured candidate LTM target cells. The network node may determine to execute an LTM cell switch to a target cell, which may be based at least in part on the L1 measurement report. As shown by reference number 412, the network node may transmit, to the UE, a MAC control element (MAC-CE) triggering the LTM cell switch, where the MAC-CE may indicate a candidate configuration index of the target cell. The UE may detach from a source cell. The UE may apply the candidate configuration index of the target cell. In other words, the UE may switch to a configuration of a candidate LTM target cell. The UE may detach from the source cell and attach to the target cell as part of an LTM execution phase.

As shown by reference number 414, the UE may perform a random access channel (RACH) procedure with the target cell (e.g., when a TA is not available). As shown by reference number 416, the UE may transmit, to the target cell, an indication of a successful completion of the LTM cell switch to the target cell. The indication of the successful completion of the LTM cell switch may be part of an LTM completion phase.

As indicated above, FIG. 4 is provided as an example. Other examples may differ from what is described with regard to FIG. 4.

An L1/L2 based inter-cell mobility may be defined for mobility latency reduction. Multiple candidate cells may be configured and maintained to allow a relatively fast application of configurations for candidate cells. A dynamic switch among candidate serving cells may be based at least in part on an L1/L2 signaling. The L1/L2 signaling may be associated with serving cell changes for LTM. In other words, changing from one serving cell to another serving cell may be based at least in part on the L1/L2 signaling. The candidate serving cells may include a special cell (SpCell) and/or a secondary cell (SCell). Further, L1 enhancements may be defined for inter-cell beam management, which may include an L1 measurement and reporting, and a beam indication.

A cell update in LTM may be based at least in part on an individual cell selection. The individual cell selection may involve separate signaling for a primary cell (PCell) change and an SCell change in a carrier aggregation scenario, respectively. A PCell selection may be based at least in part on a beam indication. An SCell selection may be based at least in part on an L1/L2 signaling, which may include a downlink control information (DCI) or a medium access control control element (MAC-CE). A single PCell without a carrier aggregation or a dual connectivity may be selected among a preconfigured candidate PCell set. A PCell change may be based at least in part on a PCell and SCell swap among the preconfigured candidate PCell set. The cell update in LTM may be based at least in part on a cell group based selection. An SpCell and an SCell may be switched together in a carrier aggregation scenario. A cell group switch signaling may be based at least in part on an extension of signaling for the individual cell selection.

Figure 5:
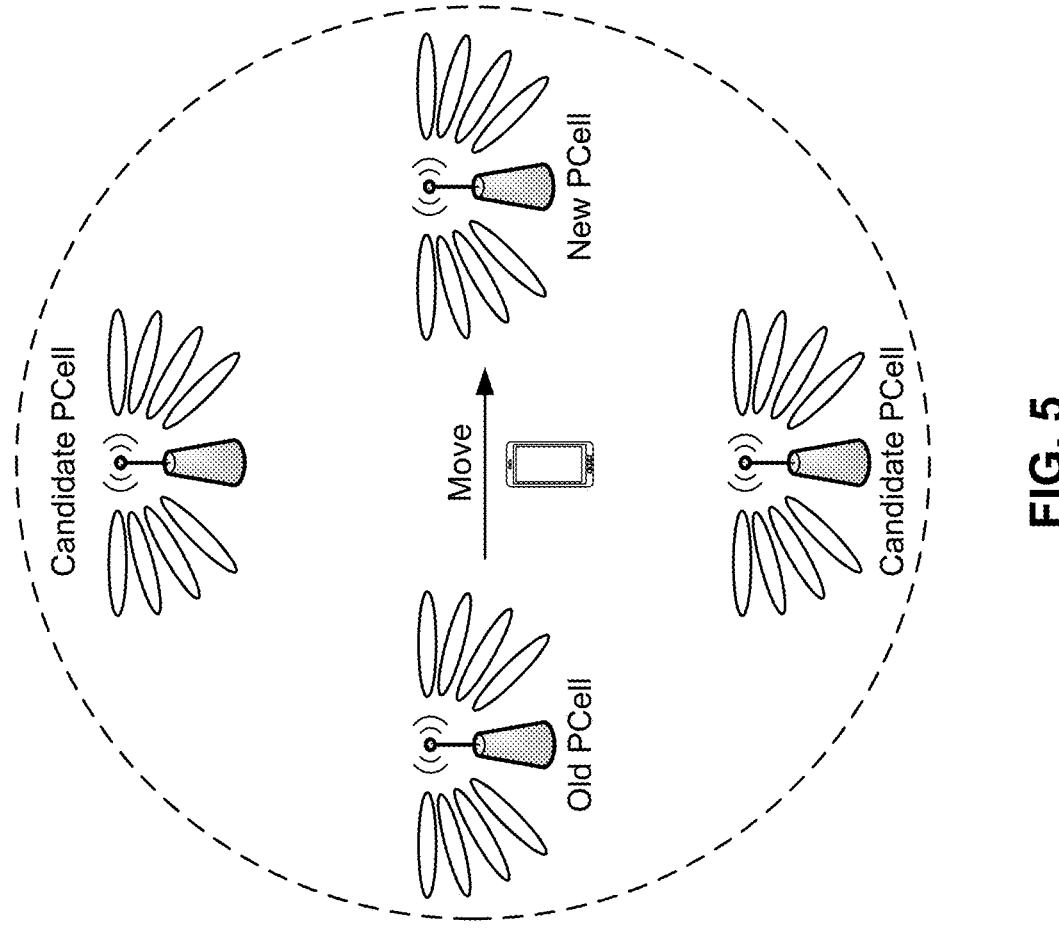
FIGS. 5-7 are diagrams illustrating examples of cell updates in LTM, in accordance with the present disclosure.

FIG. 5 is a diagram illustrating an example 500 of a cell update in an LTM, in accordance with the present disclosure.

As shown in FIG. 5, in a single PCell change without carrier aggregation, a UE may switch from an old PCell to a new PCell based at least in part on an LTM. The new PCell may be selected from among a preconfigured candidate PCell set.

As indicated above, FIG. 5 is provided as an example. Other examples may differ from what is described with regard to FIG. 5.

Figure 6:
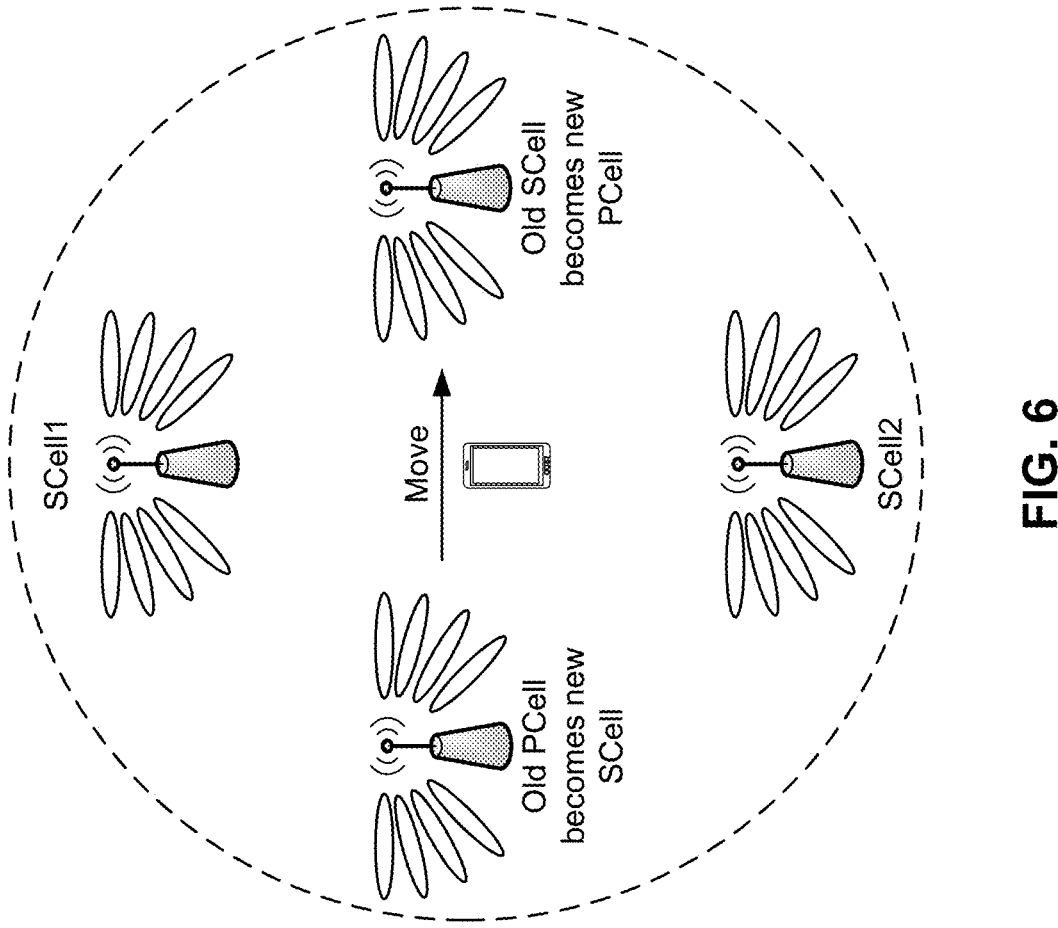

FIG. 6 is a diagram illustrating an example 600 of a cell update in an LTM, in accordance with the present disclosure.

As shown in FIG. 6, in an individual PCell/SCell change in a carrier aggregation, a UE may switch between PCells based at least in part on an LTM. An old PCell may become a new SCell and an old SCell may become a new PCell. The new PCell may be selected from among a preconfigured candidate PCell set. The preconfigured candidate PCell set may include a plurality of SCells (e.g., SCell 1, SCell 2, and the old SCell).

As indicated above, FIG. 6 is provided as an example. Other examples may differ from what is described with regard to FIG. 6.

Figure 7:
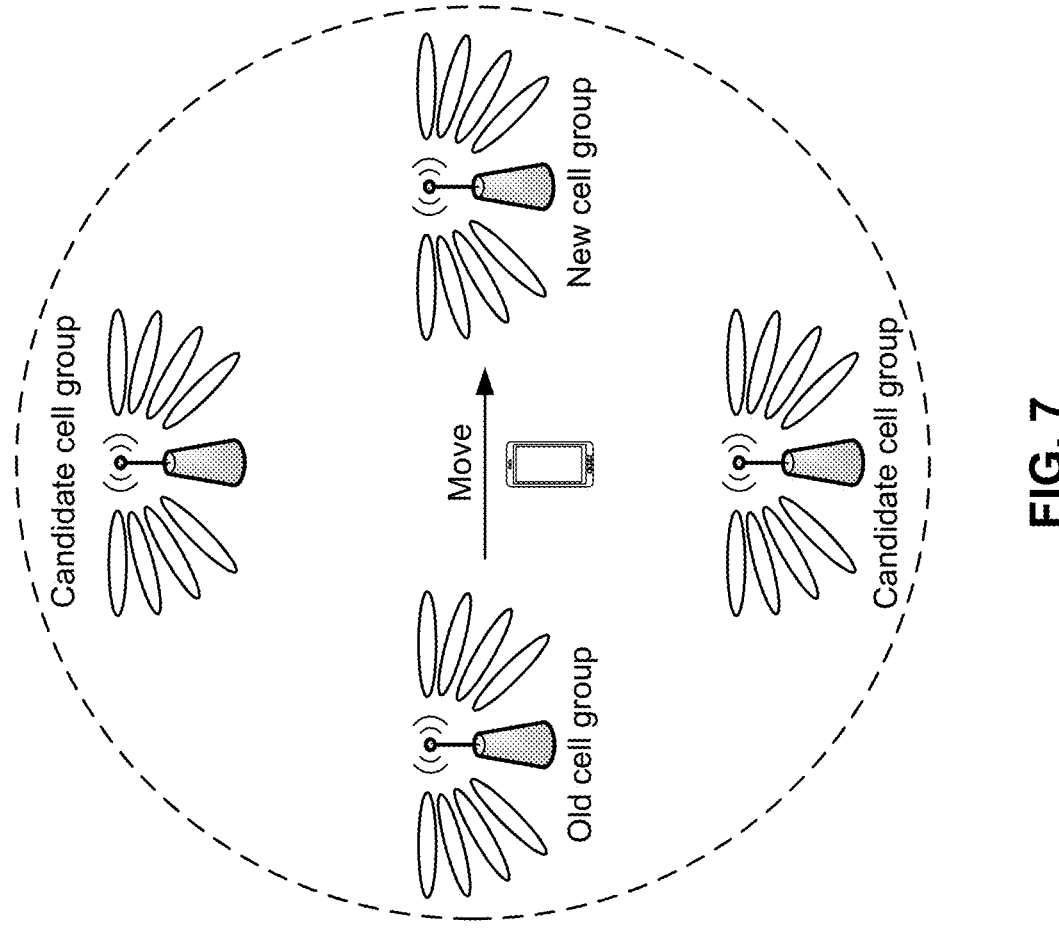

FIG. 7 is a diagram illustrating an example 700 of a cell update in an LTM, in accordance with the present disclosure.

As shown in FIG. 7, in a cell group change in a carrier aggregation, a UE may switch from an old cell group to a new cell group based at least in part on an LTM. The new cell group may be selected from among a preconfigured candidate cell group set.

As indicated above, FIG. 7 is provided as an example. Other examples may differ from what is described with regard to FIG. 7.

A UE event triggered L1 measurement report may be supported for LTM. A UE event may be defined (e.g., a triggering event definition). The UE event triggered L1 measurement report may be associated with a report container. The UE event triggered L1 measurement report may be associated with a resource allocation or assignment. A condition may be defined to start and stop a UE event triggered L1 measurement reporting. The condition may be indicated to a UE by a network node. In other words, the network node may define when the UE event is satisfied. The UE event triggered L1 measurement report may be associated with a reporting format. The UE event triggered L1 measurement report may include filtered L1 measurement results. The UE event triggered L1 measurement reporting may coexist with a periodic, semi-persistent, or periodic L1 measurement reporting. The UE event triggered L1 measurement report may be transmitted to a serving cell and/or to one or more candidate cells.

In LTM, a UE may perform L1 measurements on one or more candidate cells. The one or more candidate cells may be configured LTM candidate target cells. The UE may transmit an L1 measurement report, indicating the L1 measurements on the one or more candidate cells, to the network node. The UE may transmit the L1 measurement report in a periodic manner, but such an approach may waste resources when L1 measurement reports are not needed but the UE still transmits the L1 measurement reports. The UE may transmit event-based L1 measurement reports, instead of periodic L1 measurement reports, to conserve resources. In this case, when a certain event occurs and is detected by the UE, the UE may transmit the L1 measurement report. However, for LTM, triggering events and start/stop conditions for transmitting event-based L1 measurement reports may not be defined. In other words, the UE may not be properly configured to detect triggering events associated with the L1 measurement reports. Further, the UE may not be properly configured to determine the start/stop conditions associated with the L1 measurement reports. As a result, event-based L1 measurement reporting by the UE may be associated with inefficiencies. The UE may not properly detect events and, therefore, may not transmit L1 measurement reports to the network node, even when the L1 measurement reports are needed by the network node, which may degrade a performance of the UE. Further, the UE may transmit an excessive quantity of L1 measurement reports because the start/stop conditions may not be properly defined, thereby resulting in excess signaling and power consumption at the UE.

In various aspects of techniques and apparatuses described herein, a UE may measure an L1 metric in a candidate cell associated with an LTM. The L1 metric may be an RSRP measurement of a beam associated with the candidate cell. The UE may measure multiple L1 metrics in multiple candidate cells. The UE may determine that the L1 metric in the candidate cell satisfies a triggering event condition. For example, the UE may determine that the L1 metric in the candidate cell satisfies the triggering event condition based at least in part on: a comparison of the L1 metric in the candidate cell and a serving cell metric, a comparison of the L1 metric in the candidate cell and a threshold value, a change in the L1 metric, as compared to a previous measured L1 metric, that satisfies a threshold value, a ranking change associated with the L1 metric in the candidate cell, and/or a quantity of beams associated with the candidate cell satisfying a condition. The UE may transmit, to a network node, an L1 measurement report based at least in part on the L1 metric in the candidate cell satisfying the triggering event condition. The UE may transmit the L1 measurement report based at least in part on an L1 measurement report configuration received from the network node, which may indicate a start condition and a stop condition for transmitting the L1 measurement report, and whether the L1 measurement report is to be transmitted a single time or the L1 measurement report is to be transmitted multiple times until the stop condition is satisfied. As a result, the UE may be properly configured to transmit event-based L1 measurement reports, thereby improving a performance of the UE. The UE may be able to transmit event-based L1 measurement reports without excess signaling and power consumption, which may improve the performance of the UE.

Figure 8:
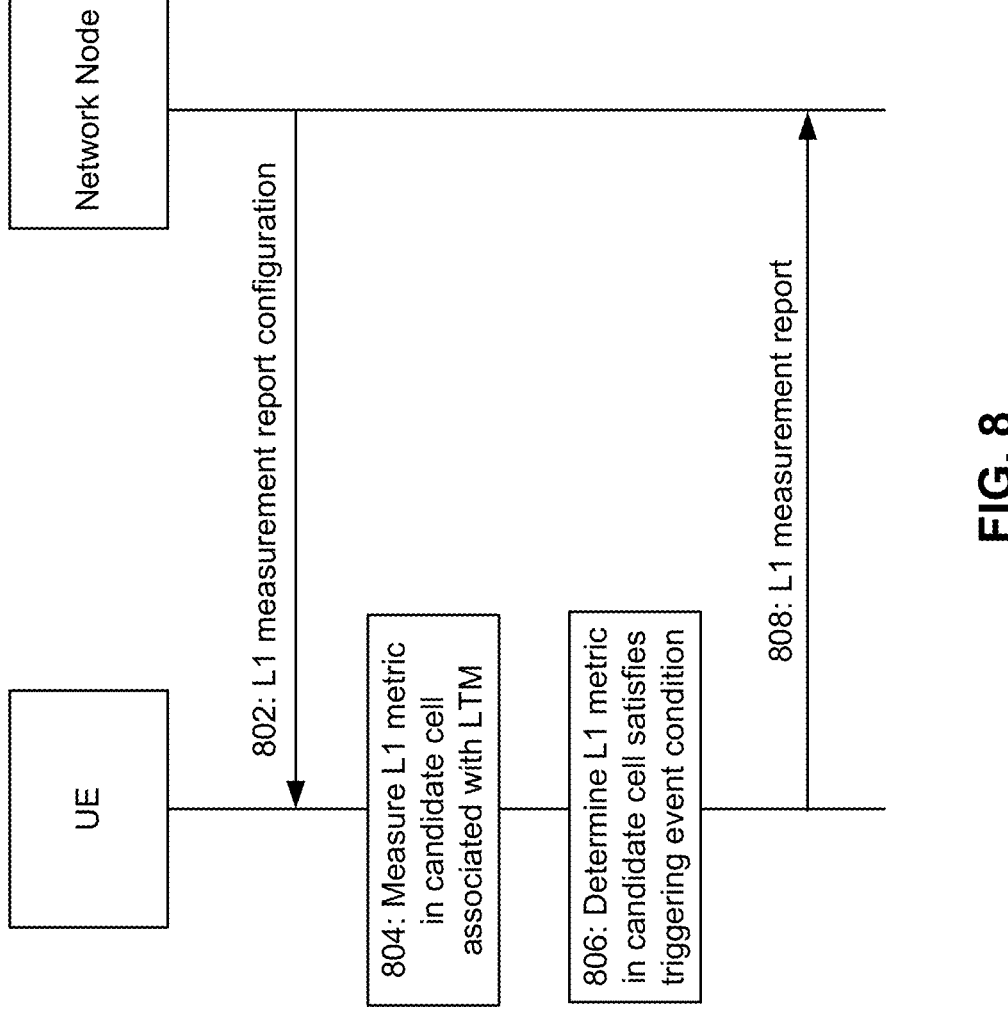
FIG. 8 is a diagram illustrating an example associated with event-based L1 measurement reporting, in accordance with the present disclosure.

FIG. 8 is a diagram illustrating an example 800 associated with event-based L1 measurement reporting, in accordance with the present disclosure. As shown in FIG. 8, example 800 includes communication between a UE (e.g., UE 120) and a network node (e.g., network node 110). In some aspects, the UE and the network node may be included in a wireless network, such as wireless network 100.

As shown by reference number 802, the UE may receive, from the network node, an L1 measurement report configuration. The L1 measurement report configuration may configure the UE to transmit an L1 measurement report. The L1 measurement report configuration may indicate whether the L1 measurement report is to be transmitted a single time, or whether the L1 measurement report is to be transmitted multiple times. The L1 measurement report configuration may indicate a start condition and/or a stop condition associated with the L1 measurement report.

As shown by reference number 804, the UE may measure an L1 metric in a candidate cell associated with an LTM. The L1 metric may be an RSRP measurement of a beam associated with the candidate cell. The L1 metric may be a filtered L1 metric, where the L1 metric may be filtered based at least in part on a standard predefinition or an indication from the network node. The L1 metric may be a spatial domain or time domain filtered L1 measurement. The candidate cell may be a candidate target cell.

As shown by reference number 806, the UE may determine that the L1 metric in the candidate cell satisfies a triggering event condition. The UE may determine that the L1 metric in the candidate cell satisfies the triggering event condition based at least in part on comparing the L1 metric in the candidate cell to a serving cell metric. The UE may determine that the L1 metric in the candidate cell satisfies the triggering event condition based at least in part on comparing the L1 metric in the candidate cell to a threshold value. The UE may determine that the L1 metric in the candidate cell satisfies the triggering event condition based at least in part on a change in the L1 metric, as compared to a previous measured L1 metric, that satisfies a threshold value. The UE may determine that the L1 metric in the candidate cell satisfies the triggering event condition based at least in part on a ranking change associated with the L1 metric in the candidate cell. The UE may determine that the L1 metric in the candidate cell satisfies the triggering event condition based at least in part on a quantity of beams associated with the candidate cell satisfying a condition. Further, the triggering event condition may be defined based at least in part on one time instance, an average value over a period of time, a maximum value over the period of time, a minimum value over the period of time, and/or a quantity of occurrences over the period of time. A start of the period of time may be defined as after a first occurrence of a predefined event.

In some aspects, the triggering event may be associated with various triggering event types. A first triggering event type may be based at least in part on comparing a beam metric in candidate cells with a serving cell metric. For example, the UE may determine whether an RSRP of a candidate cell beam is greater or worse than a best or average of measured serving cell beams, which may satisfy the triggering event condition. A second triggering event type may be based at least in part on comparing a beam metric in candidate cells with an absolute threshold. For example, the UE may determine whether an RSRP of a candidate cell beam is greater or worse than an absolute threshold (plus a defined offset), which may satisfy the triggering event condition. A third triggering event type may be based at least in part on changes in a beam metric in candidate cells. For example, the UE may determine whether an RSRP of a candidate cell increases or decrease by X dB since a last measurement, which may satisfy the triggering event condition. A fourth triggering event type may be based at least in part on ranking changes of metrics in candidate cells. For example, the UE may determine whether a change occurs in the top N good candidate beams or cell identifiers, which may satisfy the triggering event condition. A good beam may be a beam that is associated with an RSRP that satisfies a defined threshold value. A fifth triggering event type may be based at least in part on a quantity of beams satisfying a threshold. For example, the UE may determine whether a quantity of good beams in a candidate cell is larger than N (e.g., the RSRP of the good beam may be larger than the defined threshold value), which may satisfy the triggering event condition. The triggering event condition may be satisfied based at least in part on an occurrence of any one of the triggering event types.

In some aspects, the beam metric may be an L1 or spatial/time domain filtered L1 measurement, such as an L1-RSRP measurement or an L1 signal-to-interference-plus-noise ratio (SINR) measurement. In some aspects, the triggering event condition may be defined based at least in part on one time instance. The triggered event condition may be defined based at least in part on an average, maximum, or minimum value over a period of time. The triggered event condition may be defined based at least in part on a quantity of occurrences over a predefined time period. For example, when a certain quantity of events are detected before a timer expires, the triggered event condition may be satisfied.

As an example, the triggered event condition may be satisfied (e.g., an event may be detected) when a best beam among a plurality of beams (e.g., all beams) or a subset of beams (e.g., the subset of beams may be indicated by the network node) of a measured candidate cell is greater than or smaller than an absolute threshold, or is greater than or smaller than a best beam of a serving cell plus an offset. As another example, the triggered event condition may be satisfied when the best beam among the plurality of beams or the subset of beams of the measured candidate cell is greater than or smaller than the absolute threshold or the best beam of the serving cell plus the offset, and when a best beam identifier in the candidate cell changes since a last measurement. As yet another example, the triggered event condition may be satisfied when an order of candidate cell identifiers associated with good beams changes since a previous time. The good beams may be defined as the top K beams having an RSRP measurement that satisfies a threshold. For example, at a first time, the top K beams may correspond to cell identifiers of 4, 5, 5, and 7, which may correspond to RSRP values of −100 dB, −112 dB, −120 dB, and −140 dB, respectively, and at a second time, the top K beams may correspond to cell identifiers of 4, 7, 5, and 7, which may correspond to RSRP values of −102 dB, −114 dB, −120 dB, and −144 dB, respectively, which may satisfy the triggered event condition. In these examples, based at least in part on the triggered event condition being satisfied, the UE may transmit the L1 measurement report.

As shown by reference number 808, the UE may transmit, to the network node and based at least in part on the L1 measurement report configuration, the L1 measurement report based at least in part on the L1 metric in the candidate cell satisfying the triggering event condition. The UE may transmit the L1 measurement report in accordance with the start condition and/or the stop condition. The UE may transmit one instance of the L1 measurement report, or alternatively, the UE may transmit the L1 measurement report multiple times (e.g., until the stop condition is satisfied). The stop condition may be based at least in part on a maximum quantity of transmissions of the L1 measurement report. A presence of the stop condition, or a lack of the stop condition, may be based at least in part on the triggering event condition. Further, the UE may transmit the L1 measurement report in in uplink control information (UCI) via a physical uplink control channel (PUCCH) or a physical uplink shared channel (PUSCH). Alternatively, the UE may transmit the L1 measurement report in a MAC-CE via the PUSCH.

In some aspects, the UE may transmit, to the network node, an event triggered report of candidate cell L1 measurements. The UE may measure L1 metrics in candidate cells. The L1 metrics may be RSRP measurements of beams associated with the candidate cells. The UE may transmit the L1 measurement report based at least in part on the triggering event condition being satisfied. The L1 measurement report may be associated with a report container. The report container may be the UCI in the PUCCH or the PUSCH, or the report container may be the MAC-CE in the PUSCH. In other words, the UE may transmit the L1 measurement report in the UCI via the PUCCH or the PUSCH, or the UE may transmit the L1 measurement report in the MAC-CE via the PUSCH. The UE may transmit, to the network node, a scheduling request (SR) to request a resource for transmitting the MAC-CE via the PUSCH. Alternatively, the UE may use available uplink resources (e.g., any available uplink resource) to transmit the MAC-CE via the PUSCH. The SR may be associated with a dedicated resource.

In some aspects, the UE may transmit the L1 measurement report based at least in part on a triggering event. The triggering event may be based at least in part on a layer 3 (L3) event definition. The triggering event may be based at least in part on the L1 metric. The L1 metric may or may not be the filtered L1 metric. The filtered L1 metric may be different from a cell level metric defined for a legacy L3 event (e.g., only filtering in a time domain). The L1 metric may be filtered based at least in part on the standard predefinition, or based at least in part on the indication from the network node. The L1 metric may involve less computational complexity as compared to an L3 metric, and the L1 metric may better capture short term channel variations as compared to the L3 metric.

In some aspects, the L1 measurement report may be associated with the start condition and the stop condition. The triggering event types (e.g., all types of events) may be associated with the start condition to trigger the L1 measurement report. Some of the triggering event types may not need the stop condition (e.g., not all types of events require the stop condition). For example, a one-time L1 measurement report may be sufficient for some types of triggering events (e.g., a change of a cell order in an RSRP measurement ranking). Alternatively, multiple L1 measurement reports may be needed for some types of triggering events.

In some aspects, the network node may configure the UE to report one instance of the L1 measurement report, or the network node may configure the UE to periodically transmit L1 measurement reports until the stop condition is satisfied. The stop condition may depend on a maximum quantity of L1 measurement reports before the L1 measurement reports are stopped. For example, the UE may keep transmitting the L1 measurement reports until the maximum quantity is satisfied. The UE may transmit one instance of the L1 measurement report when the stop condition is not configured. A flag in an RRC configuration associated with the triggering event type may indicate whether an L1 measurement report associated with the triggering event type is a single instance L1 measurement report or a continuous L1 measurement report. For example, the network node may transmit, to the UE, the RRC configuration that includes the flag, which may indicate whether the UE is to transmit the single instance of the L1 measurement report or whether the UE is to transmit multiple instances of the L1 measurement report. The multiple instances of the L1 measurement report may be the same L1 measurement report each time or different L1 measurement reports each time. Further, when the stop condition is needed for some triggering event types (e.g., the stop condition is always required for some type of event), the network may configure a trivial stop condition, which may usually be met, to cause the UE to transmit the single instance L1 measurement report.

As an example, the triggering event condition may be satisfied when an RSRP measurement of candidate beam is greater than a predefined threshold. The UE may transmit an L1 measurement report based at least in part on the triggering event being satisfied. A start condition of a triggered L1 measurement report may define that the L1 measurement report is triggered when a beam in a candidate cell is A dB more than a first threshold value. A stop condition of the triggered L1 measurement report may define that the L1 measurement report is deactivated when all candidate beams in the candidate cell fall below B dB from a second threshold value, and when the L1 measurement report is no more than X times. The network node may configure a practically infeasibly large second threshold value or X=1, such that the stop condition may always be satisfied after one L1 measurement report is transmitted.

As indicated above, FIG. 8 is provided as an example. Other examples may differ from what is described with regard to FIG. 8.

Figure 9:
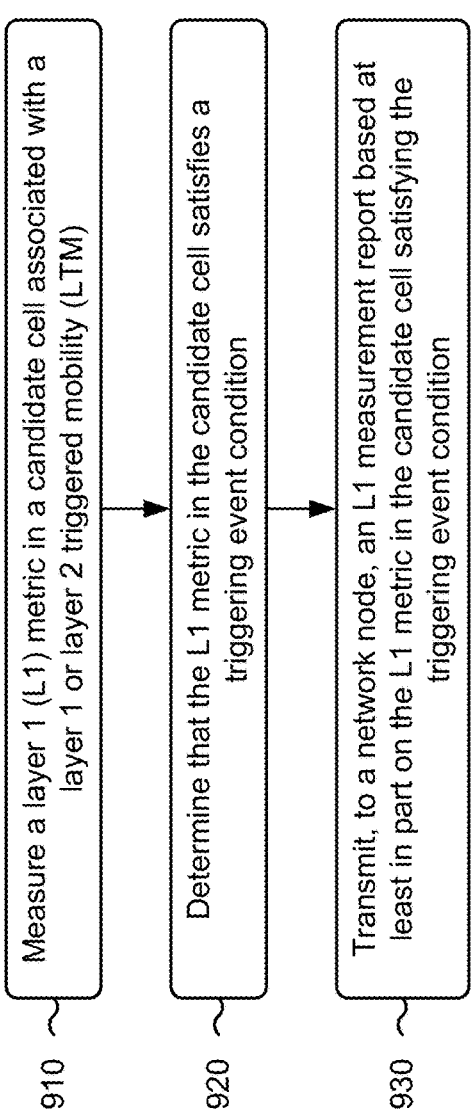
FIGS. 9-10 are diagrams illustrating example processes associated with event-based L1 measurement reporting, in accordance with the present disclosure.

FIG. 9 is a diagram illustrating an example process 900 performed, for example, by a UE, in accordance with the present disclosure. Example process 900 is an example where the UE (e.g., UE 120) performs operations associated with event-based L1 measurement reporting.

As shown in FIG. 9, in some aspects, process 900 may include measuring an L1 metric in a candidate cell associated with an LTM (block 910). For example, the UE (e.g., using communication manager 1106, depicted in FIG. 11) may measure an L1 metric in a candidate cell associated with an LTM, as described above.

As further shown in FIG. 9, in some aspects, process 900 may include determining that the L1 metric in the candidate cell satisfies a triggering event condition (block 920). For example, the UE (e.g., using communication manager 1106, depicted in FIG. 11) may determine that the L1 metric in the candidate cell satisfies a triggering event condition, as described above.

As further shown in FIG. 9, in some aspects, process 900 may include transmitting, to a network node, an L1 measurement report based at least in part on the L1 metric in the candidate cell satisfying the triggering event condition (block 930). For example, the UE (e.g., using transmission component 1104 and/or communication manager 1106, depicted in FIG. 11) may transmit, to a network node, an L1 measurement report based at least in part on the L1 metric in the candidate cell satisfying the triggering event condition, as described above.

Process 900 may include additional aspects, such as any single aspect or any combination of aspects described below and/or in connection with one or more other processes described elsewhere herein.

In a first aspect, the L1 metric is an RSRP measurement or an SINR measurement of a beam associated with the candidate cell.

In a second aspect, alone or in combination with the first aspect, process 900 includes transmitting the L1 measurement report in UCI via a PUCCH or a PUSCH, or transmitting the L1 measurement report in a MAC-CE via the PUSCH.

In a third aspect, alone or in combination with one or more of the first and second aspects, the L1 metric is a filtered L1 metric, and the L1 metric is filtered based at least in part on a standard predefinition or an indication from the network node.

In a fourth aspect, alone or in combination with one or more of the first through third aspects, process 900 includes determining that the L1 metric in the candidate cell satisfies the triggering event condition based at least in part on comparing the L1 metric in the candidate cell to a serving cell metric.

In a fifth aspect, alone or in combination with one or more of the first through fourth aspects, process 900 includes determining that the L1 metric in the candidate cell satisfies the triggering event condition based at least in part on comparing the L1 metric in the candidate cell to a threshold value.

In a sixth aspect, alone or in combination with one or more of the first through fifth aspects, process 900 includes determining that the L1 metric in the candidate cell satisfies the triggering event condition based at least in part on a change in the L1 metric, as compared to a previous measured L1 metric, that satisfies a threshold value.

In a seventh aspect, alone or in combination with one or more of the first through sixth aspects, process 900 includes determining that the L1 metric in the candidate cell satisfies the triggering event condition based at least in part on a ranking change associated with the L1 metric in the candidate cell.

In an eighth aspect, alone or in combination with one or more of the first through seventh aspects, process 900 includes determining that the L1 metric in the candidate cell satisfies the triggering event condition based at least in part on a quantity of beams associated with the candidate cell satisfying a condition.

In a ninth aspect, alone or in combination with one or more of the first through eighth aspects, the L1 metric is a spatial domain or time domain filtered L1 measurement.

In a tenth aspect, alone or in combination with one or more of the first through ninth aspects, the triggering event condition is defined based at least in part on one or more of one time instance, an average value over a period of time, a maximum value over the period of time, a minimum value over the period of time, or a quantity of occurrences over the period of time.

In an eleventh aspect, alone or in combination with one or more of the first through tenth aspects, process 900 includes transmitting the L1 measurement report based at least in part on one or more of a start condition or a stop condition.

In a twelfth aspect, alone or in combination with one or more of the first through eleventh aspects, a presence of the stop condition is based at least in part on the triggering event condition.

In a thirteenth aspect, alone or in combination with one or more of the first through twelfth aspects, process 900 includes receiving, from the network node, an L1 measurement report configuration that indicates that the L1 measurement report is to be transmitted a single time or that the L1 measurement report is to be transmitted multiple times until the stop condition is satisfied, wherein the stop condition is based at least in part on a maximum quantity of L1 measurement reports.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
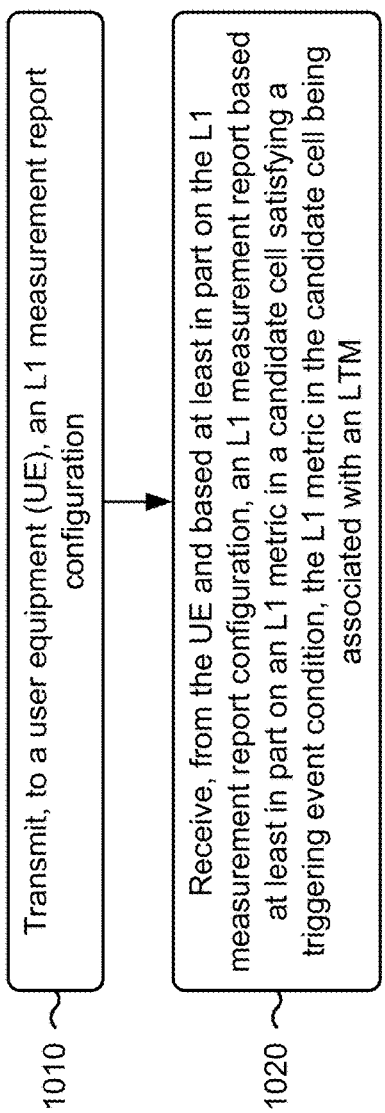

FIG. 10 is a diagram illustrating an example process 1000 performed, for example, by a network node, in accordance with the present disclosure. Example process 1000 is an example where the network node (e.g., network node 110) performs operations associated with event-based L1 measurement reporting.

As shown in FIG. 10, in some aspects, process 1000 may include transmitting, to a UE, an L1 measurement report configuration (block 1010). For example, the network node (e.g., using transmission component 1204 and/or communication manager 1206, depicted in FIG. 12) may transmit, to a UE, an L1 measurement report configuration, as described above.

As further shown in FIG. 10, in some aspects, process 1000 may include receiving, from the UE and based at least in part on the L1 measurement report configuration, an L1 measurement report based at least in part on an L1 metric in a candidate cell satisfying a triggering event condition, the L1 metric in the candidate cell being associated with an LTM (block 1020). For example, the network node (e.g., using reception component 1202 and/or communication manager 1206, depicted in FIG. 12) may receive, from the UE and based at least in part on the L1 measurement report configuration, an L1 measurement report based at least in part on an L1 metric in a candidate cell satisfying a triggering event condition, the L1 metric in the candidate cell being associated with an LTM, as described above.

Process 1000 may include additional aspects, such as any single aspect or any combination of aspects described below and/or in connection with one or more other processes described elsewhere herein.

In a first aspect, the L1 metric is an RSRP measurement or an SINR measurement of a beam associated with the candidate cell.

In a second aspect, alone or in combination with the first aspect, process 1000 includes receiving the L1 measurement report in UCI via a PUCCH or a PUSCH, or receiving the L1 measurement report in a MAC-CE via the PUSCH.

In a third aspect, alone or in combination with one or more of the first and second aspects, the L1 metric is a filtered L1 metric, and the L1 metric is filtered based at least in part on a standard predefinition or an indication from the network node.

In a fourth aspect, alone or in combination with one or more of the first through third aspects, the L1 metric in the candidate cell satisfies the triggering event condition based at least in part on the L1 metric in the candidate cell in comparison to a serving cell metric.

In a fifth aspect, alone or in combination with one or more of the first through fourth aspects, the L1 metric in the candidate cell satisfies the triggering event condition based at least in part on the L1 metric in the candidate cell in comparison to a threshold value.

In a sixth aspect, alone or in combination with one or more of the first through fifth aspects, the L1 metric in the candidate cell satisfies the triggering event condition based at least in part on a change in the L1 metric, as compared to a previous measured L1 metric, that satisfies a threshold value.

In a seventh aspect, alone or in combination with one or more of the first through sixth aspects, the L1 metric in the candidate cell satisfies the triggering event condition based at least in part on a ranking change associated with the L1 metric in the candidate cell.

In an eighth aspect, alone or in combination with one or more of the first through seventh aspects, the L1 metric in the candidate cell satisfies the triggering event condition based at least in part on a quantity of beams associated with the candidate cell satisfying a condition.

In a ninth aspect, alone or in combination with one or more of the first through eighth aspects, the L1 metric is a spatial domain or time domain filtered L1 measurement.

In a tenth aspect, alone or in combination with one or more of the first through ninth aspects, the triggering event condition is defined based at least in part on one or more of one time instance, an average value over a period of time, a maximum value over the period of time, a minimum value over the period of time, or a quantity of occurrences over the period of time.

In an eleventh aspect, alone or in combination with one or more of the first through tenth aspects, the L1 measurement report is based at least in part on one or more of a start condition or a stop condition.

In a twelfth aspect, alone or in combination with one or more of the first through eleventh aspects, a presence of the stop condition is based at least in part on the triggering event condition.

In a thirteenth aspect, alone or in combination with one or more of the first through twelfth aspects, the L1 measurement report configuration indicates that the L1 measurement report is to be transmitted a single time or that the L1 measurement report is to be transmitted multiple times until the stop condition is satisfied, wherein the stop condition is based at least in part on a maximum quantity of L1 measurement reports.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
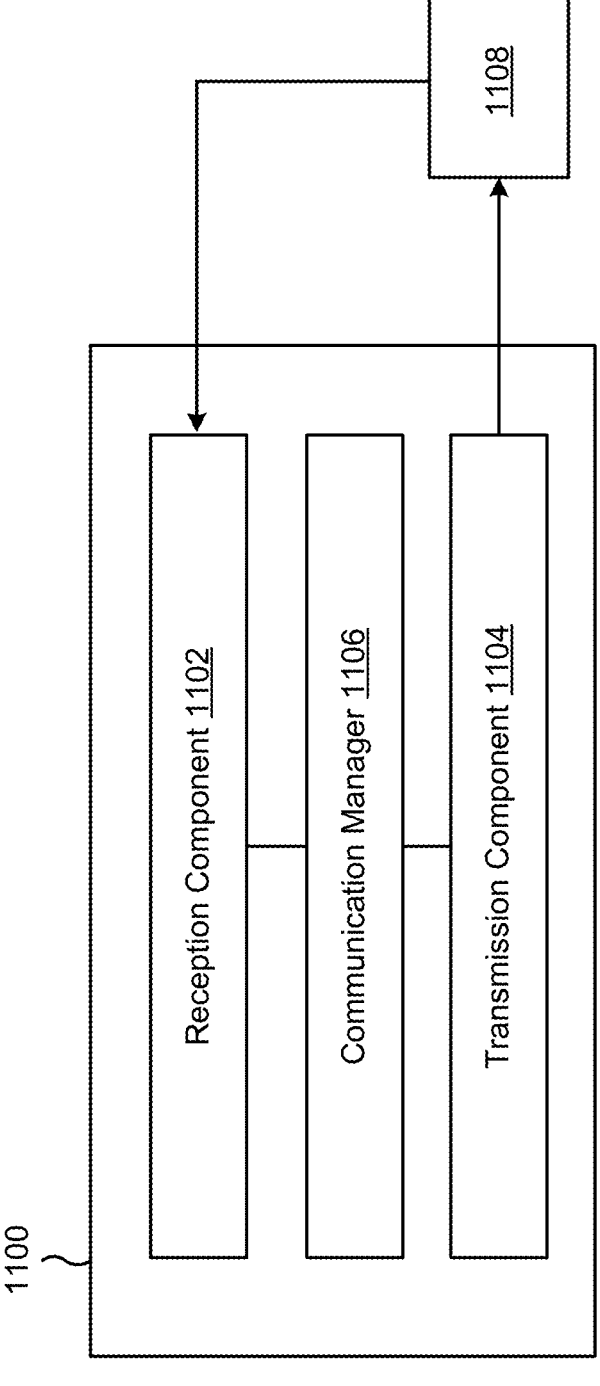
FIGS. 11-12 are diagrams of example apparatuses for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIG. 8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The communication manager 1106 may measure an L1 metric in a candidate cell associated with an LTM. The communication manager 1106 may determine that the L1 metric in the candidate cell satisfies a triggering event condition. The transmission component 1104 may transmit, to a network node, an L1 measurement report based at least in part on the L1 metric in the candidate cell satisfying the triggering event condition.

The communication manager 1106 may determine that the L1 metric in the candidate cell satisfies the triggering event condition based at least in part on comparing the L1 metric in the candidate cell to a serving cell metric. The communication manager 1106 may determine that the L1 metric in the candidate cell satisfies the triggering event condition based at least in part on comparing the L1 metric in the candidate cell to a threshold value. The communication manager 1106 may determine that the L1 metric in the candidate cell satisfies the triggering event condition based at least in part on a change in the L1 metric, as compared to a previous measured L1 metric, that satisfies a threshold value. The communication manager 1106 may determine that the L1 metric in the candidate cell satisfies the triggering event condition based at least in part on a ranking change associated with the L1 metric in the candidate cell. The communication manager 1106 may determine that the L1 metric in the candidate cell satisfies the triggering event condition based at least in part on a quantity of beams associated with the candidate cell satisfying a condition.

The transmission component 1104 may transmit the L1 measurement report in UCI via a PUCCH or a PUSCH. The transmission component 1104 may transmit the L1 measurement report in a MAC-CE via the PUSCH. The transmission component 1104 may transmit the L1 measurement report based at least in part on one or more of a start condition or a stop condition. The reception component 1102 may receive, from the network node, an L1 measurement report configuration that indicates that the L1 measurement report is to be transmitted a single time or that the L1 measurement report is to be transmitted multiple times until the stop condition is satisfied, wherein the stop condition is based at least in part on a maximum quantity of L1 measurement reports.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
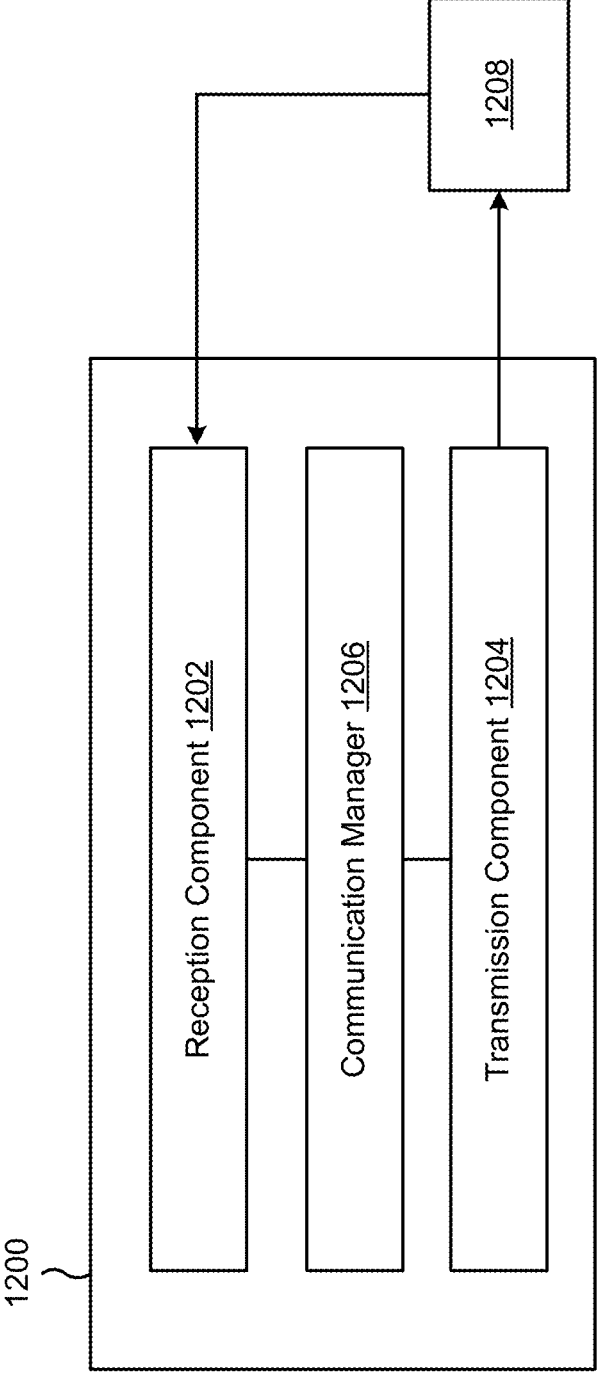

FIG. 12 is a diagram of an example apparatus 1200 for wireless communication, in accordance with the present disclosure. The apparatus 1200 may be a network node, or a network node may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 150 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIG. 8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2. In some aspects, the reception component 1202 and/or the transmission component 1204 may include or may be included in a network interface. The network interface may be configured to obtain and/or output signals for the apparatus 1200 via one or more communications links, such as a backhaul link, a midhaul link, and/or a fronthaul link.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The transmission component 1204 may transmit, to a UE, an L1 measurement report configuration. The reception component 1202 may receive, from the UE and based at least in part on the L1 measurement report configuration, an L1 measurement report based at least in part on an L1 metric in a candidate cell satisfying a triggering event condition, the L1 metric in the candidate cell being associated with an LTM.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: measuring a layer 1 (L1) metric in a candidate cell associated with a layer 1 or layer 2 triggered mobility (LTM); determining that the L1 metric in the candidate cell satisfies a triggering event condition; and transmitting, to a network node, an L1 measurement report based at least in part on the L1 metric in the candidate cell satisfying the triggering event condition.

Aspect 2: The method of Aspect 1, wherein the L1 metric is one or more of a reference signal received power (RSRP) measurement or a signal-to-interference-plus-noise ratio (SINR) measurement of a beam associated with the candidate cell.

Aspect 3: The method of any of Aspects 1-2, wherein transmitting the L1 measurement report comprises: transmitting the L1 measurement report in uplink control information (UCI) via a physical uplink control channel (PUCCH) or a physical uplink shared channel (PUSCH); or transmitting the L1 measurement report in a medium access control control element (MAC-CE) via the PUSCH.

Aspect 4: The method of any of Aspects 1-3, wherein the L1 metric is a filtered L1 metric, and wherein the L1 metric is filtered based at least in part on a standard predefinition or an indication from the network node.

Aspect 5: The method of any of Aspects 1-4, wherein determining that the L1 metric in the candidate cell satisfies the triggering event condition is based at least in part on comparing the L1 metric in the candidate cell to a serving cell metric.

Aspect 6: The method of any of Aspects 1-5, wherein determining that the L1 metric in the candidate cell satisfies the triggering event condition is based at least in part on comparing the L1 metric in the candidate cell to a threshold value.

Aspect 7: The method of any of Aspects 1-6, wherein determining that the L1 metric in the candidate cell satisfies the triggering event condition is based at least in part on a change in the L1 metric, as compared to a previous measured L1 metric, that satisfies a threshold value.

Aspect 8: The method of any of Aspects 1-7, wherein determining that the L1 metric in the candidate cell satisfies the triggering event condition is based at least in part on a ranking change associated with the L1 metric in the candidate cell.

Aspect 9: The method of any of Aspects 1-8, wherein determining that the L1 metric in the candidate cell satisfies the triggering event condition is based at least in part on a quantity of beams associated with the candidate cell satisfying a condition.

Aspect 10: The method of any of Aspects 1-9, wherein the L1 metric is a spatial domain or time domain filtered L1 measurement.

Aspect 11: The method of any of Aspects 1-10, wherein the triggering event condition is defined based at least in part on one or more of: one time instance, an average value over a period of time, a maximum value over the period of time, a minimum value over the period of time, or a quantity of occurrences over the period of time.

Aspect 12: The method of any of Aspects 1-11, wherein transmitting the L1 measurement report is based at least in part on one or more of a start condition or a stop condition.

Aspect 13: The method of Aspect 12, wherein a presence of the stop condition is based at least in part on the triggering event condition.

Aspect 14: The method of Aspect 12, further comprising: receiving, from the network node, an L1 measurement report configuration that indicates that the L1 measurement report is to be transmitted a single time or that the L1 measurement report is to be transmitted multiple times until the stop condition is satisfied, wherein the stop condition is based at least in part on a maximum quantity of L1 measurement reports.

Aspect 15: A method of wireless communication performed by a network node, comprising: transmitting, to a user equipment (UE), a layer 1 (L1) measurement report configuration; and receiving, from the UE and based at least in part on the L1 measurement report configuration, an L1 measurement report based at least in part on an L1 metric in a candidate cell satisfying a triggering event condition, the L1 metric in the candidate cell being associated with a layer 1 or layer 2 triggered mobility (LTM).

Aspect 16: The method of Aspect 15, wherein the L1 metric is one or more of a reference signal received power (RSRP) measurement or a signal-to-interference-plus-noise ratio (SINR) measurement of a beam associated with the candidate cell.

Aspect 17: The method of any of Aspects 15-16, wherein receiving the L1 measurement report comprises: receiving the L1 measurement report in uplink control information (UCI) via a physical uplink control channel (PUCCH) or a physical uplink shared channel (PUSCH); or receiving the L1 measurement report in a medium access control control element (MAC-CE) via the PUSCH.

Aspect 18: The method of any of Aspects 15-17, wherein the L1 metric is a filtered L1 metric, and wherein the L1 metric is filtered based at least in part on a standard predefinition or an indication from the network node.

Aspect 19: The method of any of Aspects 15-18, wherein the L1 metric in the candidate cell satisfies the triggering event condition based at least in part on the L1 metric in the candidate cell in comparison to a serving cell metric.

Aspect 20: The method of any of Aspects 15-19, wherein the L1 metric in the candidate cell satisfies the triggering event condition based at least in part on the L1 metric in the candidate cell in comparison to a threshold value.

Aspect 21: The method of any of Aspects 15-20, wherein the L1 metric in the candidate cell satisfies the triggering event condition based at least in part on a change in the L1 metric, as compared to a previous measured L1 metric, that satisfies a threshold value.

Aspect 22: The method of any of Aspects 15-21, wherein the L1 metric in the candidate cell satisfies the triggering event condition based at least in part on a ranking change associated with the L1 metric in the candidate cell.

Aspect 23: The method of any of Aspects 15-22, wherein the L1 metric in the candidate cell satisfies the triggering event condition based at least in part on a quantity of beams associated with the candidate cell satisfying a condition.

Aspect 24: The method of any of Aspects 15-23, wherein the L1 metric is a spatial domain or time domain filtered L1 measurement.

Aspect 25: The method of any of Aspects 15-24, wherein the triggering event condition is defined based at least in part on one or more of: one time instance, an average value over a period of time, a maximum value over the period of time, a minimum value over the period of time, or a quantity of occurrences over the period of time.

Aspect 26: The method of any of Aspects 15-25, wherein the L1 measurement report is based at least in part on one or more of a start condition or a stop condition.

Aspect 27: The method of Aspect 26, wherein a presence of the stop condition is based at least in part on the triggering event condition.

Aspect 28: The method of Aspect 26, wherein the L1 measurement report configuration indicates that the L1 measurement report is to be transmitted a single time or that the L1 measurement report is to be transmitted multiple times until the stop condition is satisfied, wherein the stop condition is based at least in part on a maximum quantity of L1 measurement reports.

Aspect 29: An apparatus for wireless communication at a device, comprising a processor; memory coupled with the processor; and instructions stored in the memory and executable by the processor to cause the apparatus to perform the method of one or more of Aspects 1-14.

Aspect 30: A device for wireless communication, comprising a memory and one or more processors coupled to the memory, the one or more processors configured to perform the method of one or more of Aspects 1-14.

Aspect 31: An apparatus for wireless communication, comprising at least one means for performing the method of one or more of Aspects 1-14.

Aspect 32: A non-transitory computer-readable medium storing code for wireless communication, the code comprising instructions executable by a processor to perform the method of one or more of Aspects 1-14.

Aspect 33: A non-transitory computer-readable medium storing a set of instructions for wireless communication, the set of instructions comprising one or more instructions that, when executed by one or more processors of a device, cause the device to perform the method of one or more of Aspects 1-14.

Aspect 34: An apparatus for wireless communication at a device, comprising a processor; memory coupled with the processor; and instructions stored in the memory and executable by the processor to cause the apparatus to perform the method of one or more of Aspects 15-28.

Aspect 35: A device for wireless communication, comprising a memory and one or more processors coupled to the memory, the one or more processors configured to perform the method of one or more of Aspects 15-28.

Aspect 36: An apparatus for wireless communication, comprising at least one means for performing the method of one or more of Aspects 15-28.

Aspect 37: A non-transitory computer-readable medium storing code for wireless communication, the code comprising instructions executable by a processor to perform the method of one or more of Aspects 15-28.

Aspect 38: A non-transitory computer-readable medium storing a set of instructions for wireless communication, the set of instructions comprising one or more instructions that, when executed by one or more processors of a device, cause the device to perform the method of one or more of Aspects 15-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
      measure a layer 1 (L1) metric in a candidate cell associated with a layer 1 or layer 2 triggered mobility (LTM), wherein the L1 metric is a filtered L1 metric, and the L1 metric is different from a cell level metric defined for a layer 3 (L3) event at the UE;
      determine that the L1 metric in the candidate cell satisfies a triggering event condition; and
      transmit, to a network node, an L1 measurement report based at least in part on the L1 metric in the candidate cell satisfying the triggering event condition.

2. The apparatus of claim 1,
   wherein the L1 metric is one or more of a reference signal received power (RSRP) measurement or a signal-to-interference-plus-noise ratio (SINR) measurement of a beam associated with the candidate cell.

3. The apparatus of claim 1,
   wherein the one or more processors, to transmit the L1 measurement report, are configured to:
      transmit the L1 measurement report in uplink control information (UCI) via a physical uplink control channel (PUCCH) or a physical uplink shared channel (PUSCH); or transmit the L1 measurement report in a medium access control control element (MAC-CE) via the PUSCH.

4. The apparatus of claim 1,
   wherein the L1 metric is filtered based at least in part on a standard predefinition or an indication from the network node.

5. The apparatus of claim 1,
   wherein the one or more processors are configured to determine that the L1 metric in the candidate cell satisfies the triggering event condition based at least in part on comparing the L1 metric in the candidate cell to a serving cell metric.

6. The apparatus of claim 1,
   wherein the one or more processors are configured to determine that the L1 metric in the candidate cell satisfies the triggering event condition based at least in part on comparing the L1 metric in the candidate cell to a threshold value.

7. The apparatus of claim 1,
   wherein the one or more processors are configured to determine that the L1 metric in the candidate cell satisfies the triggering event condition based at least in part on a change in the L1 metric, as compared to a previous measured L1 metric, that satisfies a threshold value.

8. The apparatus of claim 1,
   wherein the one or more processors are configured to determine that the L1 metric in the candidate cell satisfies the triggering event condition based at least in part on a ranking change of L1 metrics for a set of candidate cells, including the L1 metric in the candidate cell.

9. The apparatus of claim 1,
   wherein the one or more processors are configured to determine that the L1 metric in the candidate cell satisfies the triggering event condition based at least in part on a quantity of beams associated with the candidate cell satisfying a condition.

10. The apparatus of claim 1,
   wherein the L1 metric is a spatial domain or time domain filtered L1 measurement.

11. The apparatus of claim 1,
   wherein the triggering event condition is defined based at least in part on one or more of: one time instance, an average value over a period of time, a maximum value over the period of time, a minimum value over the period of time, or a quantity of occurrences over the period of time.

12. The apparatus of claim 1,
   wherein the one or more processors are configured to transmit the L1 measurement report based at least in part on one or more of a start condition or a stop condition.

13. The apparatus of claim 12,
   wherein a presence of the stop condition is based at least in part on the triggering event condition.

14. The apparatus of claim 12,
   wherein the one or more processors are further configured to:
      receive, from the network node, an L1 measurement report configuration that indicates that the L1 measurement report is to be transmitted a single time or that the L1 measurement report is to be transmitted multiple times until the stop condition is satisfied, wherein the stop condition is based at least in part on a maximum quantity of L1 measurement reports.

15. An apparatus for wireless communication at a network node, comprising:

one or more memories; and one or more processors, coupled to the one or more memories, configured to:

transmit, to a user equipment (UE), a layer 1 (L1) measurement report configuration; and receive, from the UE and based at least in part on the L1 measurement report configuration, an L1 measurement report based at least in part on an L1 metric in a candidate cell satisfying a triggering event condition, the L1 metric in the candidate cell being associated with a layer 1 or layer 2 triggered mobility (LTM), wherein the L1 metric is a filtered L1 metric, and the L1 metric is different from a cell level metric defined for a layer 3 (L3) event at the UE.

16. The apparatus of claim 15, wherein the L1 metric is one or more of a reference signal received power (RSRP) measurement or a signal-to-interference-plus-noise ratio (SINR) measurement of a beam associated with the candidate cell.

17. The apparatus of claim 15, wherein the one or more processors, to receive the L1 measurement report, are configured to:

receive the L1 measurement report in uplink control information (UCI) via a physical uplink control channel (PUCCH) or a physical uplink shared channel (PUSCH); or receive the L1 measurement report in a medium access control control element (MAC-CE) via the PUSCH.

18. The apparatus of claim 15, wherein the L1 metric is filtered based at least in part on a standard predefinition or an indication from the network node.

19. The apparatus of claim 15, wherein the L1 metric in the candidate cell satisfies the triggering event condition based at least in part on the L1 metric in the candidate cell in comparison to a serving cell metric.

20. The apparatus of claim 15, wherein the L1 metric in the candidate cell satisfies the triggering event condition based at least in part on the L1 metric in the candidate cell in comparison to a threshold value.

21. The apparatus of claim 15, wherein the L1 metric in the candidate cell satisfies the triggering event condition based at least in part on a change in the L1 metric, as compared to a previous measured L1 metric, that satisfies a threshold value.

22. The apparatus of claim 15, wherein the L1 metric in the candidate cell satisfies the triggering event condition based at least in part on a ranking change of L1 metrics for a set of candidate cells, including the L1 metric in the candidate cell.

23. The apparatus of claim 15, wherein the L1 metric in the candidate cell satisfies the triggering event condition based at least in part on a quantity of beams associated with the candidate cell satisfying a condition.

24. The apparatus of claim 15, wherein the L1 metric is a spatial domain or time domain filtered L1 measurement.

25. The apparatus of claim 15, wherein the triggering event condition is defined based at least in part on one or more of: one time instance, an average value over a period of time, a maximum value over the period of time, a minimum value over the period of time, or a quantity of occurrences over the period of time.

26. The apparatus of claim 15, wherein the L1 measurement report is based at least in part on one or more of a start condition or a stop condition.

27. The apparatus of claim 26, wherein a presence of the stop condition is based at least in part on the triggering event condition.

28. The apparatus of claim 26, wherein the L1 measurement report configuration indicates that the L1 measurement report is to be transmitted a single time or that the L1 measurement report is to be transmitted multiple times until the stop condition is satisfied, wherein the stop condition is based at least in part on a maximum quantity of L1 measurement reports.

29. A method of wireless communication performed by a user equipment (UE), comprising:

measuring a layer 1 (L1) metric in a candidate cell associated with a layer 1 or layer 2 triggered mobility (LTM), wherein the L1 metric is a filtered L1 metric, and the L1 metric is different from a cell level metric defined for a layer 3 (L3) event at the UE;

determining that the L1 metric in the candidate cell satisfies a triggering event condition; and transmitting, to a network node, an L1 measurement report based at least in part on the L1 metric in the candidate cell satisfying the triggering event condition.

30. A method of wireless communication performed by a network node, comprising:

transmitting, to a user equipment (UE), a layer 1 (L1) measurement report configuration; and receiving, from the UE and based at least in part on the L1 measurement report configuration, an L1 measurement report based at least in part on an L1 metric in a candidate cell satisfying a triggering event condition, the L1 metric in the candidate cell being associated with a layer 1 or layer 2 triggered mobility (LTM), wherein the L1 metric is a filtered L1 metric, and the L1 metric is different from a cell level metric defined for a layer 3 (L3) event at the UE.

* * * * *